June 19, 1962 W. DILLENBURGER ET AL 3,040,125

METHOD AND APPARATUS FOR RECORDING AND REPRODUCING VIDEO SIGNALS

Filed Sept. 14, 1959 3 Sheets-Sheet 1

Jnventors:
Wolfgang Dillenburger
Werner Koch
by Michael S. Striker
Attorney

Inventors:
Wolfgang Dillenburger
Werner Koch
by Michael S. Striker
Attorney

Jnventors:
Wolfgang Dillenburger
Werner Koch
by Michael S. Striker
Attorney

United States Patent Office 3,040,125 Patented June 19, 1962

3,040,125

METHOD AND APPARATUS FOR RECORDING AND REPRODUCING VIDEO SIGNALS

Wolfgang Dillenburger, Niederramstadt, near Darmstadt, Germany, and Werner Koch, Frankfurt am Main, Germany, assignors to Fernseh G.m.b.H., Darmstadt, Germany Filed Sept. 14, 1959, Ser. No. 839,969
Claims priority, application Germany Sept. 16, 1958
4 Claims. (Cl. 178—6.6)

The invention concerns a method and apparatus for recording video signals on a magnetizable carrier, preferably a magnetic tape, and for reproducing the recorded signals therefrom. In particular, the invention aims at using for the recording a frequency band in a frequency range in which a frequency-modulated carrier frequency can be recorded with the greatest efficiency.

It is known that the frequency band of the video signals is quite wide because video signals range from very low frequencies up to frequencies of several megacycles. It is further known to record the video signals in the form of a carrier frequency which is frequency-modulated by the video signals with a swing comparatively small in relation to the band width of the video signals. By using frequency modulation in this manner distortions or disturbances of the picture on account of amplitude fluctuations during the recording and during the reproduction of the signal can be avoided. However in the conventional method the carrier frequency is so selected that it is located near the upper limit of the frequency spectrum which is to be recorded, and at the same time near the upper limit of the frequency range which is capable of being magnetically recorded.

It will be understood that if the carrier frequency is of the order of the modulating frequency, unsymmetrical side bands are produced and the modulation content is concentrated principally in the side band which is in a frequency range higher than the carrier frequency. Since in magnetic recording the range of frequencies cannot be increased without limit on account of technical and economical reasons, the known method does not permit as a rule the recording of the upper side band, or at least not with a sufficient amplitude from which results a definite deterioration of the picture quality.

It is therefore a main object of this invention to provide for a method and apparatus that would overcome the above mentioned disadvantages of the conventional systems.

It is a further object of this invention to provide for a method and apparatus of the type set forth which are comparatively simple in structure and operation and deliver completely satisfactory results.

With the above objects in view a method according to the invention of recording video signals on a magnetizable carrier means comprises the step of recording mainly the upper side band of the video signals in the form of a video frequency modulated carrier frequency located near the lower limit of the video frequency band.

In a further aspect of this invention a method of recording video signals on a magnetizable carrier means comprises the steps of frequency-modulating a first carrier frequency with the video signals while limiting the frequency swing to a value comparatively small in relation to the video frequency band, said first carrier frequency being at least a five-fold multiple of the highest frequency of the video frequency band; mixing said video frequency-modulated first carrier frequency with an auxiliary frequency selected in such a manner that a second carrier frequency, frequency-modulated mainly with the upper side band of the video signals, is obtained which is located near the lower limit of a predetermined modulated frequency band within the frequency range capable of being recorded magnetically; and recording said second video frequency-modulated carrier frequency.

In still another aspect of this invention a method of reproducing video signals recorded on a magnetizable carrier in the form of a carrier frequency, frequency-modulated mainly with the upper side of the band of the video signals, comprises the steps of picking up the recorded modulated carrier frequency from the magnetizable carrier; mixing the picked-up video frequency-modulated carrier frequency with an auxiliary frequency selected in such a manner that the resulting video frequency-modulated second carrier frequency is a multiple of the highest frequency of the video frequency band; and demodulating by frequency discrimination said video frequency-modulated second carrier frequency for obtaining a video signal output.

In still another aspect of this invention, an apparatus for recording a video frequency-modulated carrier frequency on a magnetizable carrier means comprises, in combination, generator means for producing a carrier frequency having a symmetrical wave form; modulator means for frequency-modulating said carrier frequency with video signals comprising camera impulses ranging over a predetermined band width, a lower vestigial side band and an upper side band of greater energy content, said modulator means being adjusted to position said carrier frequency within said bands in such a manner that disturbing harmonics of said carrier frequency are located above the upper limit of the frequency band which is capable of being recorded magnetically.

Finally, an apparatus according to the invention for reproducing a video frequency-modulated carrier frequency recorded on a magnetizable carrier means, comprises in combination, pick-up means for picking-up the recorded modulated carrier frequency from the carrier means; auxiliary generator means for producing an auxiliary frequency substantially higher than said carrier frequency; mixer means connected between said pick-up means and said auxiliary generator means for producing a modulated second carrier frequency in the desired range; first low-pass filter means having a steep-flank characteristic and connected with the output of said mixer means for eliminating undesirable frequency components; discriminator means connected with the output of said low-pass filter means for demodulating said modulated second carrier frequency; second low-pass filter means connected with the output of said discriminator means for limiting the width of the band of said demodulated second carrier frequency; and output means connected with the output of said second filter means for delivering the desired video signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
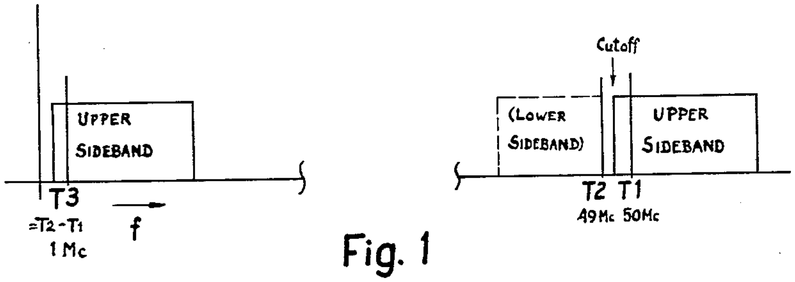
FIG. 1 is a diagram illustrating the relation of frequencies during recording according to the invention.
Figure 2:
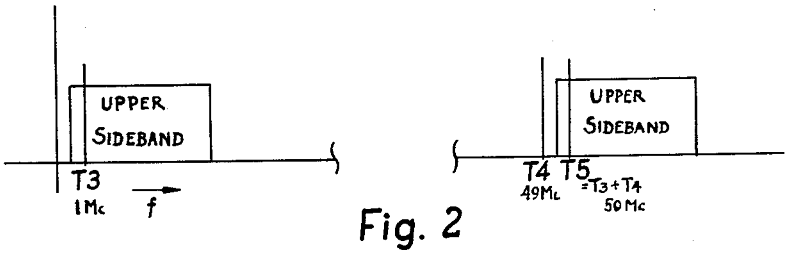
FIG. 2 is a similar diagram showing the relation of frequencies during reproduction of the signals recorded according to the present invention.

Some essential features of the method according to the invention will be described now in reference to FIG. 1 which illustrates the recording method and to FIG. 2 which illustrates the reproducing method.

In this example it may be assumed that the video signal covers a frequency range with an upper limit of 5 mc. This signal is used for first frequency-modulating a carrier frequency T1 the frequency whereof is a multiple of the highest video frequency and in this case may be 50 mc. The frequency swing may be in this case 1 mc. Hereafter the greater part of the lower side band, e.g. all frequencies below .5 mc. of the modulating frequencies are cutoff. The thus obtained frequency-modulated carrier frequency containing mainly only the upper side band, is now mixed with a second carrier frequency T2, the frequency whereof is below that of the first carrier frequency T1 and is in this example 49 mc. The resulting third carrier frequency T3 of the video frequency band is then located near the lower limit of the video frequency band, in this example at 1 mc. This video frequency-modulated carrier frequency is then applied to the recording heads and recorded on the magnet tape or other magnetizable carrier.

Figure 3:
FIG. 3 is a diagram illustrating the characteristic of a discriminator used in the method and apparatus according to the invention.

The procedure in the reproduction or pick-up of the recorded signal is similar. As indicated by FIG. 2 the video frequency-modulated carrier frequency T3 is picked-up from the record carrier and mixed with an auxiliary carrier frequency T4 the frequency whereof is a multiple of the highest video frequency so that a new carrier frequency is obtained which is located again in a very high frequency range. Preferably this carrier frequency is selected to be equal to the first carrier frequency T1 used in the recording operation. In the particular example the auxiliary frequency T4 is chosen to be equal to the auxiliary frequency T2 of 49 mc. Therefore the mixing of the frequencies T3 and T4 results in a new frequency-modulated carrier frequency T5 of 50 mc. This video-modulated carrier frequency is then demodulated by a discriminator which should have for instance a characteristic as indicated by FIG. 3. The purpose and function of the just described modulating and demodulating operation is to eliminate disturbances otherwise caused by the harmonics of the carrier frequency.

It has been found that this result can be obtained satisfactorily only if the carrier frequency itself is substantially free of harmonics and if during the recording and during the reproduction from the tape or carrier no non-linear distortions occur. Therefore it is necessary to strictly avoid, during the recording, a departure from the regular magnetization characteristic of the tape or carrier by excessive magnetization. But even then non-linear distortions of the carrier frequency could not be avoided if the magnetization characteristic of the tape or carrier is not linear itself. The necessary care for a recording of the carrier frequency without any substantial distortion calls not only for a careful control or limitation of the recording current during the recording, but also calls for avoiding a magnetization of the carrier up to saturation which could easily occur in the frequency modulation process and, in fact, would be desirable in the interest of a high efficiency of the recording operation.

Moreover it has been found that distortions occurring in the recording of sinusoidal wave forms on a magnetic tape mainly occur only in the range of comparatively low frequencies and decrease with increasing recorded frequencies. Also, such distortions are caused mainly by uneven harmonics, particularly by the third harmonic.

The invention is further based on the fact that these disturbances or distortions can be avoided if in the recording operation a frequency-modulated frequency band is used which comprises the carrier frequency band, a lower vestigial side band and an upper side band of greater energy content, based on a carrier frequency which is located within said bands in such a manner that disturbing harmonics of the carrier frequency are located above and beyond the upper limit frequency which can be recorded magnetically on the record carrier.

It is of great adavntage if in this case the carrier frequency is not chosen to be higher than necessary for meeting the above mentioned requirements so that the frequency range of the signal to be recorded is not widened more than necessary. For instance, for avoiding disturbances through the third harmonic it is sufficient to choose the carrier frequency slightly higher than the value of one-half of the modulating frequency. In this case the frequency band of the magnetic recording has to extend only to a value equal to slightly more than about one-and-half times the value of the highest modulating frequency. It is further desirable that the frequency characteristic of the recording above said value drops steeply. This can be achieved by proper selection of the first zero digit of the recording so that those portions of the third and higher harmonic which are located above said limit frequency will not be recorded. Of course, the limitation of the frequency band to be recorded can also be achieved by a low-pass filter having a suitably selected limit frequency. It can be seen that in the above described example also a lower vestigial side band reaching up to the first partial frequency of about one-half of the highest modulating frequency is recorded.

It is further quite important that the wave form of the magnetically recorded carrier frequency is substantially symmetrical and that it does not contain even harmonics, particularly the second harmonic. For this purpose the signal furnished by the frequency modulator device should have also a symmetrical wave form.

Should it happen that in the recording operation also even harmonics, particularly the second harmonic, appear then, according to the invention, the carrier frequency can be positioned at such a high level that also the second harmonic is located above the upper limit of the frequency band which can be magnetically recorded.

On the other hand, if it is desired that the upper side band including the first partial frequency of the highest modulation frequency should be recorded, then the carrier frequency must be positioned slightly above the highest modulation frequency and the frequency band of the magnetic recording must be extended to a value which is somewhat above twice the value of the highest modulation frequency. No recording must occur in the frequency range above this value, or the frequency band to be recorded must be limited by filtering.

It is further desirable that the reproduction characteristic of the magnetic recording is such that within the swing of the frequency modulation of the carrier frequency amplitudes occur which are as large as possible but do not contain substantial amplitude fluctuations. At least the characteristic in this range should have an approximately symmetrical form. This can be achieved for instance by proper selection of the resonance frequency of the oscillator circuit which comprises the inductivity of the recording heads, and by proper dimensioning of the distortion correction members of the recording and reproduction amplifiers, respectively.

Figure 4:
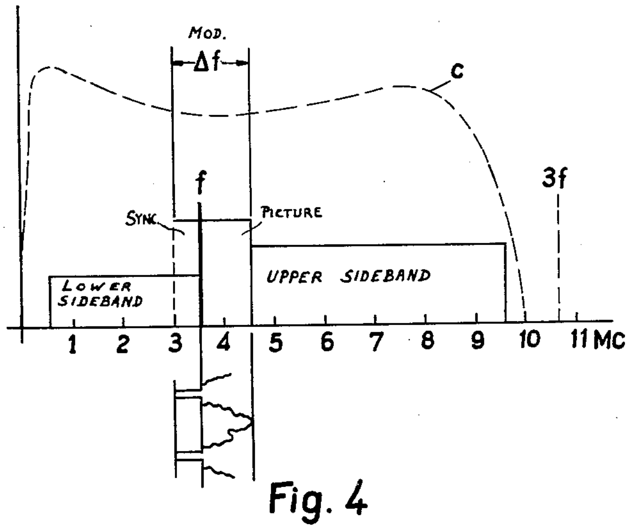
FIG. 4 is a diagram illustrating the relation of frequencies and other characteristics in the recording method according to the invention.

Referring now to the example illustrated by FIG. 4, the relations between the various frequencies appearing in the frequency modulated signals to be recorded are shown on the basis of the European standard for video signals amounting to a frequency band width of up to 5 mc.

Now it may be assumed that disturbances through the third harmonic are to be avoided. Therefore, the carrier frequency $f$ is at least of such a value that its third harmonic $3f$ is located above the highest frequency to be recorded. This latter frequency is easily determined by computing the maximum value of the frequency-modulated carrier frequency at maximum swing (e.g. 1 mc.), plus the maximum modulation frequency. This latter modulation frequency has to correspond to the first side band frequency of the upper side band of the frequency-modulated signal and is therefore 5 mc. Consequently, for the present example, the condition that the third harmonic $3f$ of the carrier frequency $f$ be located beyond the frequency band to be recorded, is met by arranging the carrier frequency $f$ associated with the reference value of the video signal (black level) at 3.5 mc. as is shown in FIG. 4. The upper side band of the frequency-modulated frequency extends in this case up to 9.5 mc., but the third harmonic $3f$ appears at 10.5 mc.

Shown in FIG. 4 is, also in dotted lines, the shape of the reproduction characteristic C of the magnetic recording. In accordance with statements made further above, this characteristic must have in the range of the higher frequency such a form that, on one hand, the recording of the highest frequency of 9.5 mc. is possible with sufficient amplitude, and that, on the other hand, the third harmonic of 10.5 mc. cannot be recorded and transmitted with any appreciable amplitude.

As also stated further above, it is preferable that the reproduction characteristic C indicates as large amplitudes as possible within the frequency range occupied by the frequency modulation $\Delta f$, the shape of the characteristic being approximately horizontal and, relative to the mean value of the carrier frequency, symmetrical.

Figure 5:
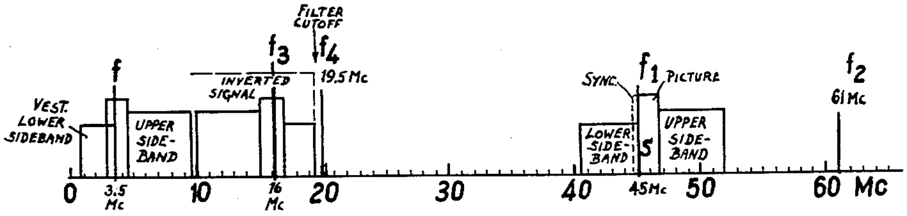
FIG. 5 is a diagram illustrating the relation of various frequencies involved in a preferred embodiment of the recording method according to the invention.
Figure 7:
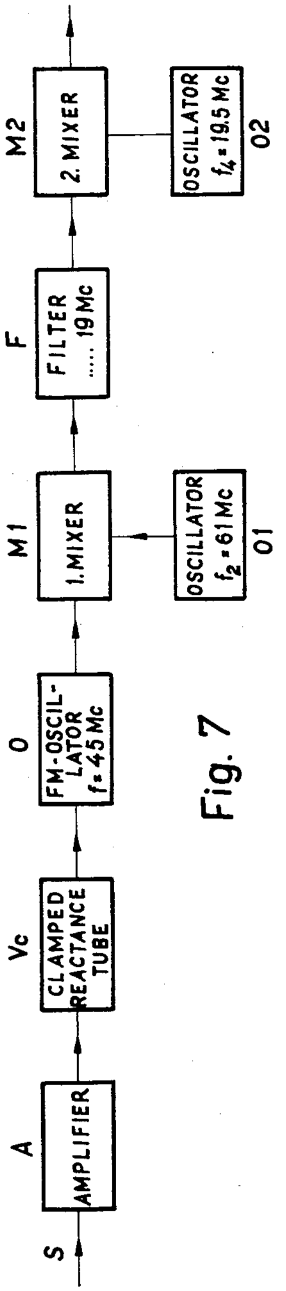
FIG. 7 is a block diagram illustrating a recording apparatus according to the invention.

FIG. 7 illustrates in the form of a block diagram a preferred embodiment of an apparatus for recording video signals in accordance with the invention. The operation of this device will be best understood from a description of the frequency diagram FIG. 5. A carrier frequency $f1$ of 45 mc. is frequency-modulated by video signals S comprising, generally speaking, picture or camera signals above the carrier frequency and synchronization below the carrier frequency. The picture content of the video signals are located in the range of from 45 to 46 mc., the synchronization signals ranging between 44.5 and 45 mc. If the modulation swing is as small as just mentioned in relation to the modulation frequency then the amplitude of the partial frequencies of a higher than the first order decreases within the range of the higher modulation frequencies so rapidly that it is considered to be sufficient to record only the modulation band including the first partial frequency (considering high modulation frequencies). Therefore, in the case of a maximum modulation frequency of 5 mc. the side bands extend in upward direction to 51 mc. and in downward direction to 40 mc. as indicated in FIG. 5. Since the highest modulation frequency is not small as compared with the carrier frequency, unsymmetrical side bands are developed, the energy content of the upper side band being larger than that of the lower side band which is illustrated in FIG. 5 by the different amplitudes of the diagrammatically shown side bands.

Now the frequency-modulated signal on the carrier frequency $f1$ is transposed by two consecutive transposition steps into the frequency range suitable for recording. By mixing the frequency-modulated frequency $f1$ with an auxiliary frequency $f2$ of 61 mc. summational and differential frequencies are produced, only the differential frequencies whereof are being used. Consequently, the carrier frequency $f1$ is transposed into a second carrier frequency $f3$ having a frequency of 16 mc. However, the signal or the frequency band carried by the carrier frequency $f3$ is inverted so that the side bands appear in reverse position relative thereto. The original upper side band which has the greater energy content appears now as a lower side band of the carrier $f3$ and extends downwardly to 10 mc., while the other side band appears above the carrier frequency $f3$. By filtering, that portion of the side band appearing above the carrier $f3$ is cut off at 19 mc. so that instead only a vestigial side band extending over about 3 mc. is left. Now this limited signal is mixed with another auxiliary frequency $f4$ of 19.5 mc. in order to transpose the frequency $f3$ into the frequency range suitable for recording. The resulting third carrier frequency $f$ is therefore now positioned at the desired frequency level of 3.5 mc. In this last mentioned transposition the signal or the relative position of the side bands is again reversed so that the originally upper side band of higher energy content again appears as an upper side band while the vestigial side band appears as the lower side band.

The use of two consecutive transpositions is of advantage because in this manner the frequency-modulated signal can be brought by the first transposition into a frequency range in which the limitation or reduction of one of the side bands can be carried out by means of filtering with a filter of sufficient sharpness of the cutoff slope of the filter characteristic.

FIG. 7 illustrates in the form of a block diagram an apparatus which is suitable for carrying out the above described sequence of steps. The video signal S is applied to an amplifier A where it is amplified and from which it is delivered to the frequency modulator arrangement. The frequency-modulatable oscillator O may be of the type known as regenerative electron-tube generator containing an oscillatory circuit and is capable to operate on a carrier frequency $f1$ of 45 mc. in accordance with the above described example. In this oscillator the resonance frequency is varied by influencing an element of the oscillatory circuit by means of a reactance tube VC depending upon the signal amplitude. For stabilizing the working point on the characteristic of the reactance tube and thereby stabilizing the carrier frequency the reactance tube is provided with a clamp circuit. The clamping impulses are derived in a generally known manner from the synchron component of the signal.

The frequency-modulated 45 mc. carrier frequency $f1$ is now applied to a first mixer M1 and is mixed therein with an auxiliary frequency $f2$ of 61 mc. furnished by an auxiliary oscillator or generator 01. The output $f3$ of 16 mc. from the first mixer M1 is then fed through a filter F having an upper limit frequency of 19 mc. so that only the differential frequencies produced by the mixer M1 are permitted to pass, while a portion of the side band having the lower energy content within the transposed frequency-modulated signal is suppressed. The output of the filter F is connected with a second mixer M2 where the filtered signal is mixed with a second auxiliary frequency F4 of 19.5 mc. with the result that at the output of the mixer M2 appears the final frequency-modulated frequency $f$ of 3.5 mc. which is suitable for being recorded. It can be seen that by minute adjustments of the frequency of the second auxiliary oscillator the position of the final carrier frequency $f$ can be adjusted exactly to the value selected in accordance with the invention.

Figure 6:
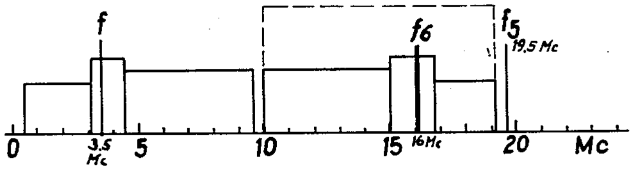
FIG. 6 is a similar diagram illustrating the relation of various frequencies in the reproducing method according to the invention.

As stated above the procedure in the reproduction of the recorded video signals is similar to that described above for the recording and based on the same principle. It is to be understood that the demodulation of the picked-up frequency-modulated signal is carried out only after transposing the recorded signal to a higher frequency level. As illustrated by the diagram of FIG. 6 the recorded frequency-modulated carrier frequency $f$ of 3.5 mc. is mixed with an auxiliary frequency $f5$ of 19.5 mc. Of the resulting summational and differential frequencies only the latter are being utilized, namely the carrier frequency $f6$ of 16 mc. This latter frequency is separated from remanents of the auxiliary frequency $f5$ and from the summational frequencies by filtering. After the filtering operation the actual video signal can be derived from the frequency-modulated signal by means of discrimination. It is advisable to carry out a band limitation by additional filtering through a low-pass filter device.

Figure 8:
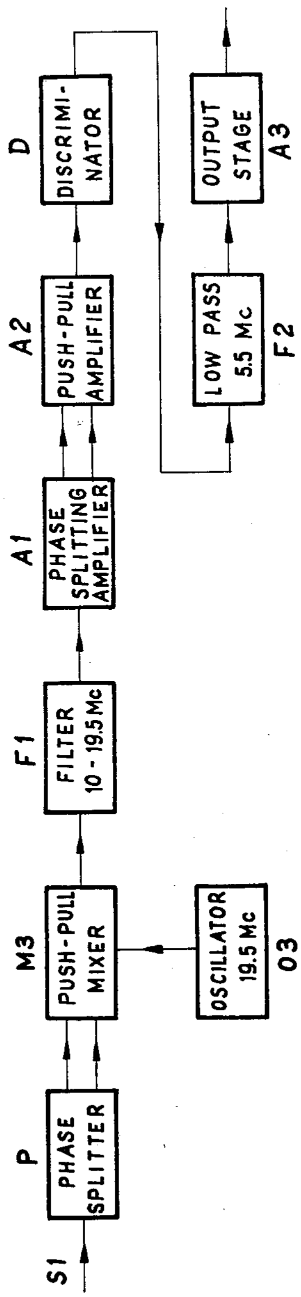
FIG. 8 is a block diagram of a reproducing apparatus according to the invention.

FIG. 8 illustrates in the form of a block diagram a preferred embodiment of a demodulator arrangement for reproducing the video signal from the recorded signal. The picked-up recorded signal S1 having a carrier frequency $f$ of 3.5 mc. is first applied to a phase splitter device P for obtaining two signals of opposite phases which are then fed to a push-pull mixer device M3. An auxiliary frequency $f5$ of 19.5 mc. furnished by an auxiliary oscillator O3 is also introduced into the mixer M3 in push-pull fashion. The push-pull mixer M3 furnishes only the respective two modulation bands. The auxiliary frequency $f5$ is suppressed and appears at the output of the mixer M3 only with insignificant amplitude. The lower modulation band and the remnants of the auxiliary frequency $f5$ are then fed to a filter F1 having the limit frequencies 10 and 19.5 mc. The thus limited output from the filter F1 is then supplied to a multi-stage amplifier A1 comprising a band pass coupling circuit. The final stage of the amplifier A1 is a phase splitter stage and furnishes signals of opposite phases which are then supplied to a push-pull amplifier A2 and from there to a discriminator D. Here the frequency-modulated signal is demodulated and converted to an amplitude-modulated video signal. It has been found that for this purpose a discriminator of the type known as delay-line discriminator is most suitable. The output signal is limited by a low-pass filter F2 having a limit frequency of 5.5 mc., and preferably provided with phase distortion correction, whereafter the final video signal is delivered through the output stage A3.

It has been found that in carrying out the above described method the position of the frequency-modulated signal within the particular frequency range must be accurately maintained in order to be sure that this signal is always within the range in which a recording is possible with good efficiency. Moreover, frequency deviations of the recorded frequency band must be avoided also in order to avoid disturbances or distortions of the demodulated reproduced signal. The demodulators usually contain electrical filters for suppressing undesirable frequencies appearing outside the frequency band of the signal but such filters will operate in the above described manner only if the frequency level of the frequency-modulated signal remains uniform within close limits.

In conventional frequency modulators used for magnetic video signal recording the relation between the magnitude of the modulation voltage and the corresponding frequency is usually not maintained with the great accuracy required for the present method. This is particularly true for the frequently used multi-vibrators and also particularly for those modulation methods in which first a carrier frequency of high frequency is modulated and the thus frequency-modulated signal is transposed by mixing with the constant frequency output of a second oscillator into a frequency band of lower frequency range which then can be recorded with good efficiency on a magnetic tape. Since in this case the frequencies to be recorded appear as the differences of two higher frequencies, absolute frequency fluctuations of the frequency modulator and of the auxiliary oscillator have a significant effect on the frequency of the signal to be recorded.

In order to avoid these disadvantages it is advisable to adjust or control the frequency of the signal which is to be recorded so as to have a sufficiently constant value for a particular reference frequency periodically recurring in the video signal.

According to the invention, it is therefore proposed, in a method of recording video signals on a magnetizable band or carrier by means of frequency modulation, to derive from any frequency deviation of a reference frequency periodically recurring in the frequency-modulated signal a control voltage corresponding to any such deviations from a preset desired value of that reference frequency whereby the frequency modulator is influenced in such a manner that the control voltage counteracts any such deviation of the reference frequency from the desired value thereof.

It has been found that as a suitable reference frequency the synchronization signal, or particularly the frequency corresponding to the black level in the video signal can be used. However, it is not obvious nor easy to utilize these just mentioned frequencies for stabilizing the reference frequency.

In order to solve this problem, the invention provides for adding to the video signal in the blanking intervals particularly during the duration of the synchronization impulses, or only during the duration of the rear black level porch, a substantially rectangular signal in such a manner that during the duration or period of this rectangular signal a carrier frequency near the lower limit of the video frequency band, preferably of one to 1.5 mc. appears.

In doing this the advantage is gained that the stabilization of the carrier frequency can be carried out on the basis of a frequency of the order of 1 mc. which is particularly simple and can be carried out with simple means. It can be seen, that in this case even at a moment when the carrier frequency is not being modulated, i.e., when there is no video signal composed of the synchronizing signal and the picture or camera impulses, also a carrier frequency of the exact indicated and desired frequency level is obtained.

In a preferred form of the respective method the stabilization of the carrier frequency can be obtained by comparing, in a manner known per se, the carrier frequency with a frequency of great constancy which is preferably produced by a quartz controlled oscillator. The frequency comparison is carried out only during those short periods during which the particular carrier frequency is available, i.e., during the period of the rectangular impulse added to the signal. From the appearing frequency difference a control voltage is derived in a manner known per se which voltage is used for influencing the frequency of the frequency modulator in such a manner that this influence counteracts any frequency deviation of the carrier frequency from the preset desired value represented by the above mentioned comparison frequency. The control voltage, however, may also be obtained by exciting a resonance circuit with a frequency appearing in the frequency modulated signal during the duration of the above mentioned added rectangular impulses. The resonance voltage appearing in the case of a frequency deviation from the desired value can then be used as the control voltage for the frequency modulator.

In some cases it is also of advantage to arrange matters in such a manner that the carrier frequency appearing when the frequency modulator is not subjected to a modulating frequency, is positioned within a frequency range which can be recorded on a magnetic carrier with good efficiency.

It will be understood that each of the elements described above, or two or more together, may also find a useful application in other types of method and apparatus for recording and reproducing video signals differing from the types described above.

While the invention has been illustrated and described as embodied in a method and apparatus for recording and reproducing video signals by means of a frequency-modulated carrier frequency, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In an apparatus for reproducing a video signal from a video frequency-modulated carrier frequency recorded on a magnetizable carrier means, in combination, pick-up means for picking up the recorded modulated carrier frequency from the carrier means; auxiliary generator means for producing an auxiliary frequency at least twice the highest recorded video frequency; mixer means connected between said pick-up means and said auxiliary generator means for producing a modulated second carrier frequency in a frequency range determined by the difference between said carrier and auxiliary frequencies; first low pass filter means having a steep-flank characteristic and connected with the output of said mixer means for eliminating undesirable frequency components located outside the frequency band of the video signal; discriminator means connected with the output of said low-pass filter means for demodulating said modulated second carrier frequency; second low-pass filter means connected with the output of said discriminator means for limiting the width of the band of said demodulated second carrier frequency; and output means connected with the output of said second filter means for delivering the desired video signal.

2. In an apparatus for recording a video frequency-modulated carrier frequency on a magnetizable carrier means, in combination, resonator type generator means for producing a frequency-modulated first carrier frequency of the order of ten times the highest desired modulation frequency; reactance tube means in circuit with said generator means for frequency-modulating the carrier frequency output of said generator means with a video signal; first auxiliary generator means for producing a first auxiliary frequency; first mixer means connected between the outputs of said resonator type generator means and of said first auxiliary generator means, respectively, for producing a first modulated differential carrier frequency, said first auxiliary frequency being higher than said first carrier frequency by such an amount that said first differential frequency is higher than the upper limit frequency capable of being magnetically recorded, the modulating video signal appearing inverted on said first differential carrier frequency with the original lower side band appearing in a band portion above said carrier frequency; low pass filter means connected with the output of said first mixer means for cutting off an upper portion of said band portion; second auxiliary generator means for producing a second auxiliary frequency somewhat higher than said upper limit frequency; second mixer means connected between the outputs of said second generator means and said filter means, respectively, for producing a second modulated differential carrier frequency, the modulating video signal appearing re-inverted on said second differential carrier frequency with the original upper side band appearing in a band portion above said second differential carrier frequency; and output means connected with the output of said second mixer means for delivering a magnetically recordable video frequency-modulated carrier frequency.

3. Apparatus as claimed in claim 2, wherein said resonator type generator means is capable of producing a substantially symmetrical wave form.

4. Apparatus as claimed in claim 2 including recording means for magnetically recording the video frequency-modulated carrier frequency output of said output means, said recording means being capable of producing a recording having a reproduction characteristic which is substantially horizontal within the frequency modulation range of the recorded signal.

References Cited in the file of this patent

UNITED STATES PATENTS

| | | |
|---|---|---|
| 1,907,109 | Hinton | May 2, 1933 |
| 2,874,222 | DeJager | Feb. 17, 1959 |
| 2,956,114 | Ginsburg et al. | Oct. 11, 1960 |